United States Patent
Li et al.

(10) Patent No.: US 12,175,501 B2
(45) Date of Patent: Dec. 24, 2024

(54) AI TO AI COMMUNICATION

(71) Applicant: Visa International Service Association, San Francisco, CA (US)

(72) Inventors: Yue Li, Sunnyvale, CA (US); Theodore Harris, San Francisco, CA (US); Tatiana Korolevskaya, Mountain View, CA (US)

(73) Assignee: Visa International Service Association, San Francisco, CA (US)

( * ) Notice: Subject to any disclaimer, the term of this patent is extended or adjusted under 35 U.S.C. 154(b) by 386 days.

(21) Appl. No.: 17/025,097

(22) Filed: Sep. 18, 2020

(65) Prior Publication Data
US 2021/0090136 A1    Mar. 25, 2021

Related U.S. Application Data

(60) Provisional application No. 62/903,552, filed on Sep. 20, 2019.

(51) Int. Cl.
*G06Q 30/0282*    (2023.01)
*G06Q 30/0201*    (2023.01)
*G06Q 50/00*    (2024.01)

(52) U.S. Cl.
CPC ..... *G06Q 30/0282* (2013.01); *G06Q 30/0201* (2013.01); *G06Q 50/01* (2013.01); *G06Q 2220/00* (2013.01)

(58) Field of Classification Search
CPC ........... G06Q 30/0282; G06Q 30/0201; G06Q 50/01; G06Q 2220/00
USPC ...................................................... 707/607
See application file for complete search history.

(56) References Cited

U.S. PATENT DOCUMENTS

| | | | |
|---|---|---|---|
| 9,928,290 B2 | 3/2018 | Tiell | |
| 10,635,471 B2* | 4/2020 | Davis | G06Q 40/08 |
| 2017/0054611 A1* | 2/2017 | Tiell | G06Q 30/0631 |
| 2017/0287038 A1* | 10/2017 | Krasadakis | G06Q 30/0201 |
| 2019/0332921 A1* | 10/2019 | Rodriguez | H04L 9/0643 |
| 2020/0143242 A1* | 5/2020 | Lafontaine | G06N 3/045 |
| 2021/0064346 A1* | 3/2021 | Exertier | G06F 8/60 |

OTHER PUBLICATIONS

Yadlapalli et al., "Artificially Intelligent Decentralized Autonomous Organization," IEEE, Mar. 16, 2020, 5 pages.
Calvaresi et al., "Multi-Agent Systems and Blockchain: Results from a Systematic Literature Review," Apr. 11, 2018, 16 pages.
Das et al., "TarMac: Targets Multi-Agent Communication," Oct. 26, 2018, 10 pages.

* cited by examiner

*Primary Examiner* — Hosain T Alam
*Assistant Examiner* — Saba Ahmed
(74) *Attorney, Agent, or Firm* — Kilpatrick Townsend & Stockton LLP

(57) ABSTRACT

A method includes collecting, by a first AI application of a first AI computer, data to include in a dataset. The first AI application of the first AI computer can include an offer for the dataset into an offering platform. The first AI application of the first AI computer can then receive a response to the offer from a second AI application of a second AI computer. The first AI application of the first AI computer can determine whether or not to provide the dataset to the second AI application of the second AI computer. The first AI application of the first AI computer can, based on the determination, provide the dataset to the second AI application of the second AI computer.

18 Claims, 5 Drawing Sheets

AI TO AI COMMUNICATION

CROSS-REFERENCE TO RELATED APPLICATIONS

This application is a non-provisional application, which claims priority to U.S. Provisional Application No. 62/903,552, filed on Sep. 20, 2019, which is herein incorporated by reference in its entirety.

BACKGROUND

The creation of data has exploded since the inception of the Internet. According to one report, it is estimated that 2.5 quintillion bytes of data are created every single day, and that by 2020, 1.7 MB of data will be created every second for every person on earth.

There is a need to quickly and accurately analyze data, especially high frequency data from high frequency data sources. High frequency data can refer to time-series data that can be collected at a fine scale. Examples of high frequency data may include data feeds from users of social networks, stock market data, etc. The transfer of potentially useful high frequency data from a first computer to a second computer can be too slow to render such data useful. For example, the entity operating the second computer first needs to evaluate the usefulness of the data provided by the first computer, and then needs to exchange some value (e.g., money) for the data to obtain it. These steps delay processing of the data by the second computer, and can render such data less effective to the second computer than would otherwise be desirable.

Embodiments of the invention address this problem and other problems individually and collectively.

SUMMARY

One embodiment is related to a method comprising: collecting, by a first AI application of a first AI computer, data to include in a dataset; providing, by the first AI application of the first AI computer, an offer for the dataset to an offering platform; receiving, by the first AI application of the first AI computer, a response to the offer from a second AI application of a second AI computer; determining, by the first AI application of the first AI computer, whether or not to provide the dataset to the second AI application of the second AI computer; and based on the determining, providing, by the first AI application of the first AI computer, the dataset to the second AI application of the second AI computer in an interaction.

Another embodiment of the invention includes an AI computer comprising: a processor; and a computer readable medium coupled to the processor, the computer readable medium comprising code, executable by the processor, to implement a method comprising collecting data to include in a dataset; providing an offer for the dataset to an offering platform; receiving a response to the offer from a second AI application of a second AI computer; determining whether or not to provide the dataset to the second AI application of the second AI computer; and based on the determining, providing the dataset to the second AI application of the second AI computer in an interaction.

Another embodiment of the invention includes a method comprising: selecting, by a second AI application of a second AI computer, an offer for a dataset on an offering platform; transmitting, by the second AI application of the second AI computer, a response to the offer to a first AI application of a first AI computer associated with the offer, wherein the first AI application of the first AI computer determines whether or not to provide the dataset to the second AI application of the second AI computer; and receiving, by the second AI application of the second AI computer, the dataset from the first AI application of the first AI computer.

Another embodiment of the invention includes an AI computer comprising a processor, and a computer readable medium. The computer readable medium comprises code, executable by the processor to implement a method comprising: selecting an offer for a dataset on an offering platform; transmitting a response to the offer to a first AI application of a first AI computer associated with the offer, wherein the first AI application of the first AI computer determines whether or not to provide the dataset to the second AI application of the second AI computer; and receiving the dataset from the first AI application of the first AI computer.

These and other embodiments are described in further detail below in the Detailed Description and in the Figures.

DETAILED DESCRIPTION

Figure 1:
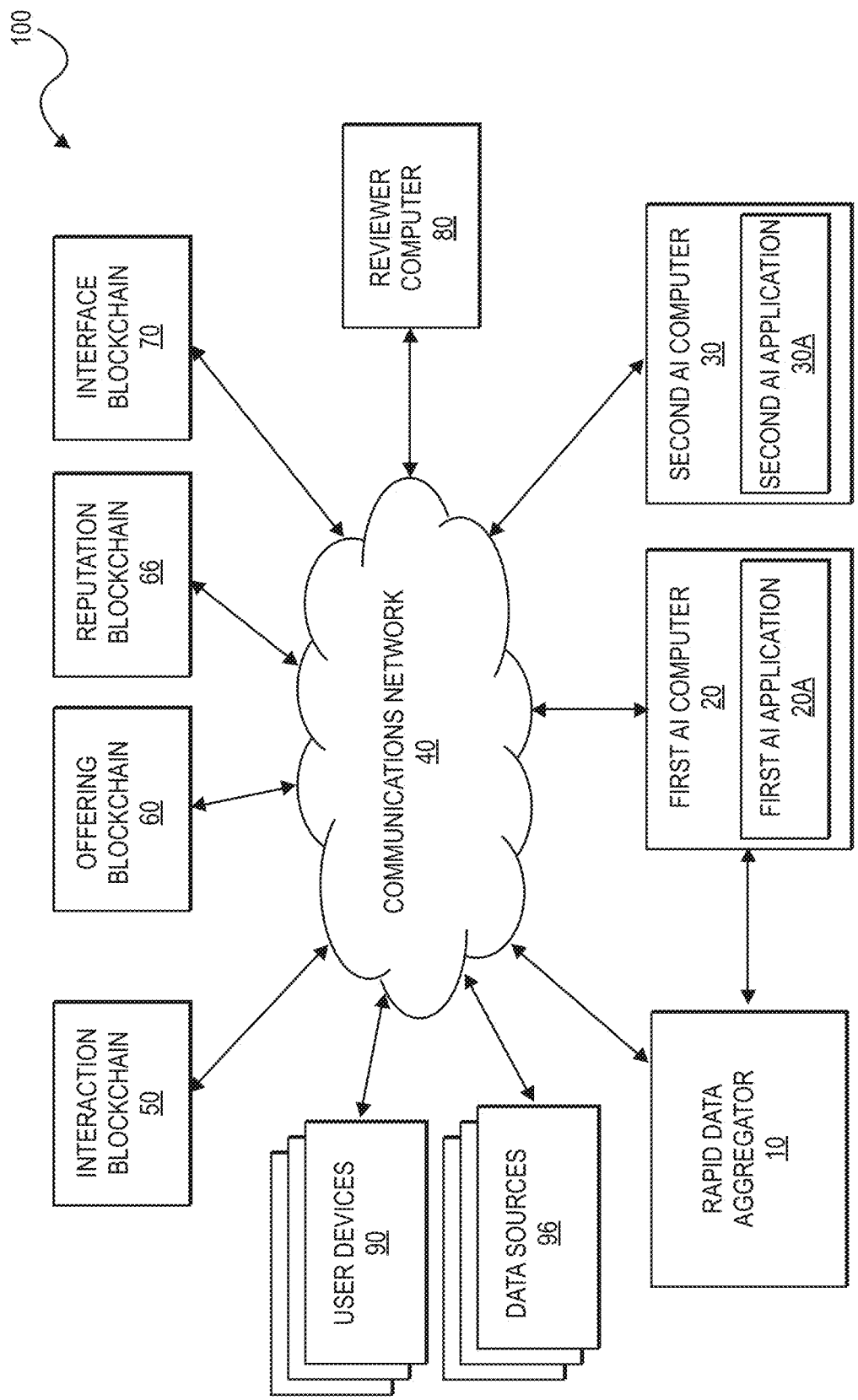
FIG. 1 shows a block diagram of a system according to embodiments.

Prior to discussing embodiments of the invention, some terms can be described in further detail.

An "AI computer" may include one or more devices that can run an artificial intelligence application. In some embodiments, an AI computer can include a single computational device. In other embodiments, an AI computer can include a network of computational devices.

"Machine learning" can include an artificial intelligence process in which software applications may be trained to make accurate predictions through learning. The predictions can be generated by applying input data to a predictive model, which is formed by performing statistical analyses on aggregated data. A model can be trained using training data, such that the model may be used to make accurate predictions. The prediction can be, for example, a predicted classification of an image, a predicted purchase of a user, etc.

An "artificial intelligence application" or machine learning model may include an application of artificial intelligence that provides systems with the ability to automatically learn and improve from experience without explicitly being programmed. An artificial intelligence application or machine learning model may include a set of software routines and parameters that can predict an output of a process (e.g., identification of an attacker of a computer network, authentication of a computer, a suitable recommendation based on a user search query, etc.) based on a "feature vector" or other input data. A structure of the software routines (e.g., number of subroutines and the relation between them) and/or the values of the parameters can be determined in a training process, which can use actual results of the process that is being modeled, e.g., the identification of different classes of input data. Examples of machine learning models include support vector machines (SVM), models that classify data by establishing a gap or boundary between inputs of different classifications, as well as neural networks, collections of artificial "neurons" that perform functions by activating in response to inputs. An artificial intelligence application may have an artificial intelligence identifier or ID associated with it to identify it from among other artificial intelligence applications. It may further store or have access to a secret cryptographic key such as a private key of a public-private key pair. The public-private key pair may be assigned to a specific artificial intelligence module.

A "feature vector" may include a set of measurable properties (or "features") that represent some object or entity. A feature vector can include collections of data represented digitally in an array or vector structure. A feature vector can also include collections of data that can be represented as a mathematical vector, on which vector operations such as the scalar product can be performed. A feature vector can be determined or generated from input data. A feature vector can be used as the input to a machine learning model, such that the machine learning model produces some output or classification. The construction of a feature vector can be accomplished in a variety of ways, based on the nature of the input data. For example, for a machine learning classifier that classifies words as correctly spelled or incorrectly spelled, a feature vector corresponding to a word such as "LOVE" could be represented as the vector (12, 15, 22, 5), corresponding to the alphabetical index of each letter in the input data word. For a more complex "input," such as a human entity, an exemplary feature vector could include features such as the human's age, height, weight, a numerical representation of relative happiness, etc. Feature vectors can be represented and stored electronically in a feature store. Further, a feature vector can be normalized, i.e., be made to have unit magnitude. As an example, the feature vector (12, 15, 22, 5) corresponding to "LOVE" could be normalized to approximately (0.40, 0.51, 0.74, 0.17).

A "blockchain" can be a database that maintains a continuously-growing list of records secured from tampering and revision. A blockchain may include a number of blocks of event records recorded by one or more peers. Each block in the blockchain can also include a timestamp and a link to a previous block. For example, each block may include a hash of the previous block. Stated differently, event records in a blockchain may be stored as a series of "blocks," or permanent files that include a record of a number of events occurring over a given period of time. Blocks may be appended to a blockchain by an appropriate peer after it completes the block and the block is validated. In embodiments of the invention, a blockchain may be distributed, and a copy of the blockchain may be maintained at each peer in a blockchain network.

A "node" of a blockchain can be a computer or software node. In some cases, each node in a blockchain network has a copy of a digital ledger or blockchain. Each node checks the validity of each transaction. In some cases, if a majority of nodes say that a transaction is valid then it is written into a block.

A "key pair" may include a pair of linked cryptographic keys. For example, a key pair can include a public key and a corresponding private key. In a key pair, a first key (e.g., a public key) may be used to encrypt a message, while a second key (e.g., a private key) may be used to decrypt the encrypted message. Additionally, a public key may be able to verify a digital signature created with the corresponding private key. The public key may be distributed throughout a network in order to allow for verification of messages signed using the corresponding private key. Public and private keys may be in any suitable format, including those based on RSA or elliptic curve cryptography (ECC). In some embodiments, a key pair may be generated using an asymmetric key pair generation algorithm.

A "digital signature" may be an electronic signature for a message. A digital signature may be a numeric data value, an alphanumeric data value, or any other type of data. In some embodiments, a digital signature may be a unique data value generated from a message (or data packet) and a private key using a cryptographic algorithm. In some embodiments, a validation algorithm using a public key may be used to verify the signature.

A "block header" can be a header including information regarding a block. A block header can be used to identify a particular block on a blockchain. A block header can comprise any suitable information, such as a previous hash, a Merkle root, a timestamp, and a nonce. In some embodiments, a block header can also include a difficulty value.

An "interaction" may include a reciprocal action or influence. An interaction can include a communication, contact, or exchange between parties, devices, and/or entities. Example interactions include a transaction between two parties and a data exchange between two devices. In some embodiments, an interaction can include a user requesting access to secure data, a secure webpage, a secure location, and the like. In other embodiments, an interaction can include a payment transaction in which two devices can interact to facilitate a payment.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers.

A "processor" may refer to any suitable data computation device or devices. A processor may comprise one or more microprocessors working together to accomplish a desired function. The processor may include a CPU comprising at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

A "user" may include an individual. In some embodiments, a user may be associated with one or more personal accounts and/or user devices.

A "user device" may be any suitable device that can be used by a user. User devices may be in any suitable form. Some examples of user devices include cellular phones, PDAs, personal computers (PCs), tablet computers, and the like. In some embodiments, where a user device is a mobile device, the mobile device may include a display, a memory, a processor, a computer-readable medium, and any other suitable component.

A "mobile device" (sometimes referred to as a mobile communication device) may comprise any suitable electronic device that may be transported and operated by a user, which may also provide remote communication capabilities to a network. A mobile communication device may communicate using a mobile phone (wireless) network, wireless data network (e.g. 3G, 4G or similar networks), Wi-Fi, Bluetooth, Bluetooth Low Energy (BLE), Wi-Max, or any other communication medium that may provide access to a network such as the Internet or a private network. Examples of mobile devices include mobile phones (e.g. cellular phones), PDAs, tablet computers, net books, laptop computers, wearable devices (e.g., watches), vehicles such as automobiles and motorcycles, personal music players, handheld specialized readers, etc.

Embodiments of the invention allow for the processing of high frequency data by various AI applications associated with AI computers, resulting in rapid AI application to AI application communication. Each AI computer in the system can include an artificial intelligence application that may be associated with an AI identifier (e.g., AI ID). The AI identifier can be in any suitable form. In some embodiments, the AI identifier can be in the form of a public key of a public-private key pair, or a derivation thereof (e.g., a hash of a public key). In other embodiments, the AI identifier can be in the form of an alphanumeric data string that is assigned to the AI application by a central administrative entity.

In embodiments of the invention, a second AI application may make a decision to communicate with a first AI application to obtain a dataset from it. The system can make it easy to select between the best AI applications from many possible AI applications. For example, a second AI application can determine a best AI application that can provide the best dataset for its purposes.

The direct communication between AI applications in embodiments of the invention reduces the need for human users to request data and perform the steps needed to gather data. For example, high frequency data (e.g., data created at a high frequency) can be automatically transferred and processed by AI applications, and the speed of transferring and processing the data is not impeded by human user action. Embodiments of the invention can enable AI applications to scan for available relevant datasets, validate dataset sources, as well as provide feedback regarding the datasets and their sources. In embodiments of the invention, processing can be done automatically, which advantageously makes embodiments of the invention more efficient than conventional systems.

For example, in some embodiments, a first AI application of a first AI computer can collect data to include in a dataset. The first AI application of the first AI computer can include an offer for the dataset into an offering platform such as an offering blockchain. However, it is understood that the offer may be included on any suitable offering platform. The first AI application of the first AI computer can receive a response to the offer from a second AI application of a second AI computer. Then, the first AI application of the first AI computer can determine whether or not to provide the dataset to the second AI application of the second AI computer. The first AI application of the first AI computer can, based on the determination, provide the dataset to the second AI application of the second AI computer.

In some embodiments, a second AI application of the second AI computer can select an offer for a dataset on an offering platform. The second AI application of the second AI computer can transmit a response to the offer to the first AI application of the first AI computer associated with the offer. The first AI application of the first AI computer can determine whether or not to provide the dataset to the second AI application of the second AI computer. The second AI application of the second AI computer can then receive the dataset from the first AI application of the first AI computer. The second AI application of the second AI computer can then process the dataset.

In some embodiments, an AI application can include a script, which uses natural language processing to create a dataset from data from a rapid data aggregator. As another example, an AI application can include a script which tracks high frequency interactions (e.g., transactions, data transfers, etc.) from a rapid data aggregator and extracts data from those interactions.

In some embodiments, an AI application may communicate with various blockchains. Such blockchains can include a dynamic interface blockchain, an interaction blockchain, and an offering blockchain.

The AI application can also communicate with a reputation blockchain. A block of the reputation blockchain can store any suitable data. For example, the block can store an AI application identifier, a reputation (e.g., a reputation value of the AI application), terms, payment information, transaction information, residuals (e.g., which may result from a second AI using the data in a machine learning model, the residuals being product of the machine learning model representative of how well the data from the first AI performed), a rebuttal, and/or a score. The reputation blockchain can be updated based on new reputation changes, new interactions (e.g., new transactions, new data transfers), etc.

The various blockchains used in embodiments of the invention can be validated in any suitable manner. In some embodiments, each participant can be validated by a validation authority (e.g., a reviewer computer) from the beginning, prior to allowing the participant to participate on a particular blockchain. In this situation, no fraud is expected from the validated participants, when the validated participants are validating transactions and forming new blocks in the blockchain. In some embodiments, the algorithm used to select a node-validator can include a Proof-of-Stake like process. In other embodiments, a validation authority can calculate a trust score for each node (participant), which has permission to validate new blocks. This score can serve as currency in a stake deposit to define a next node-validator. In some embodiments, a transaction fee for validating a block may be provided.

Embodiments of the invention can also use a dynamic blockchain interface. For example, a first AI application can communicate with a second AI application via a protocol. A dynamic API interface can allow the first and second AI applications to use a blockchain to share proposed updates to other AI applications and entities in the system. This dynamic API interface can adjust what information should be shared and how it should be shared before the transfer of any datasets. Further, the dynamic API interface may, in some embodiments, be updated by the AI applications in an autonomous fashion.

FIG. 1 shows a system 100 according to embodiments of the invention. For simplicity of illustration, a certain number of components are shown in FIG. 1. It is understood, however, that embodiments of the invention may include more than one of each component.

The system 100 comprises rapid data aggregator 10, which may work in conjunction with a first AI computer 20. A plurality of user devices 90 may provide data to the rapid data aggregator 10.

The rapid data aggregator 10 can communicate with the first AI computer directly or via a communications network 40. The first AI computer 10 may communicate with a second AI computer 30 via the communications network 40. The first AI computer 20 and the second AI computer 30 can communicate with an interaction blockchain 50, an offering blockchain 60, a reputation blockchain 66, an interface blockchain 70, and a reviewer computer 80 via the communications network 40. The interaction blockchain 50 is an example of an interaction platform. The offering blockchain 60 can be an example of an offering platform. The reputation blockchain 66 can be an example of a reputation platform. The interface blockchain 70 may be an example of an interface platform.

The rapid data aggregator 10 can include a system that includes one or more computers that can collect data generated by the one or more user devices 90 or other data sources 96. The data sources 96 may include other computers, not necessarily operated by specific users, that provide data. Examples of such data sources might include computers that provide data from user data (e.g., stock prices generated by the purchases and sale of stocks by individual users, aggregated data from IoT or "Internet of Things" devices, etc.).

The interaction blockchain 50 may be a transaction blockchain where each block includes records of transactions. The interaction blockchain 50 may store individual interactions (e.g., transactions) in blocks. Each individual interaction can include AI application identifiers associated with the AI applications interacting with each other, and any agreed upon values or data exchange associated with the interaction. For example, a typical interaction between a first AI application and a second AI application might include an identifier for the first AI application, an identifier for the second AI application, a description of the dataset to be acquired by the second AI application from the first AI application, and a price associated with the transfer of the dataset. Digital signatures of the first AI application and/or the second AI application may be included in the interaction data to indicate their assent to the interaction. In some embodiments, the description of the dataset may include a dataset identifier, and this may also be included in the interaction. The dataset identifier may be also present on a separate offering blockchain that offers the dataset to various AI applications participating in the system.

The offering blockchain 60 can be a blockchain which includes offers of data collected by AI applications. The offering blockchain may store offers by AI applications to provide various datasets to provide datasets to other AI applications. The offering blockchain may include blocks with descriptions of offers, each offer including an AI application identifier of the application offering the dataset, a description of the dataset, an identifier of the dataset, and optionally a time period in which the offer for the dataset is valid. For example, if an AI application obtains a dataset of social media posts from high level government officials over a predefined period (e.g., the past year), then the AI application may provide a description of this dataset and a dataset identifier for the dataset as an offer that can be present in the block of the offering blockchain.

The reputation blockchain 66 can store the reputations and/or feedback provided by the AI applications in the system. The reputations may pertain to the reputations of the AI applications themselves or the datasets provided by those AI applications. The blocks in the reputation blockchain 66 may store reviews or feedback along with the AI application or dataset identifiers associated with those reviews or feedback, as well as timestamps associated with the reviews or feedback and/or when the datasets were originally obtained by the AI application receiving them. The reputation blockchain 66 allows AI applications within the system to review the reviews of the datasets or the AI applications provide the datasets, before they request the datasets. This can result in a more efficient system as higher quality datasets will be requested, and the AI applications will be induced to provide higher quality datasets.

The interface blockchain 70 can include details regarding the interface from which the entities and/or AI applications can interact with the blockchains described herein. For example, the interface blockchain 70 can include blocks which record changes to the interfaces of the various entities in the system. For example, a particular AI application with a desirable dataset may change its IP address over time. Another application seeking to obtain a dataset from that AI application may search the interface blockchain 70 for the correct IP address before communicating with the AI application with the dataset.

Further, in embodiments of the invention, an AI reputation service can be associated with, for example, a dispute resolution entity which can evaluate and resolve disagreements between AI applications. The dispute resolution entity may operate the reviewer computer 80. The reviewer computer 80 may also have programming or functions that allow the reviewer computer 80 to play the role of the administrator of the overall system. For example, the reviewer computer 80 can register AI applications to the system, and may assign AI application identifiers to the registered AI applications. It could also assign or register cryptographic keys associated with the various AI applications.

Messages between the components in FIG. 1 can be transmitted using a secure communications protocols such as, but not limited to, File Transfer Protocol (FTP); Hyper-Text Transfer Protocol (HTTP); Secure Hypertext Transfer Protocol (HTTPS), SSL, ISO (e.g., ISO 8583) and/or the like. The communications network 40 that may reside between the devices may include any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. The communications network can use any suitable communications protocol to generate one or more secure communication channels. A communications channel may, in some instances, comprise a secure communication channel, which may be established in any known manner, such as through the use of mutual authentication and a session key, and establishment of a Secure Socket Layer (SSL) session.

Figure 2:
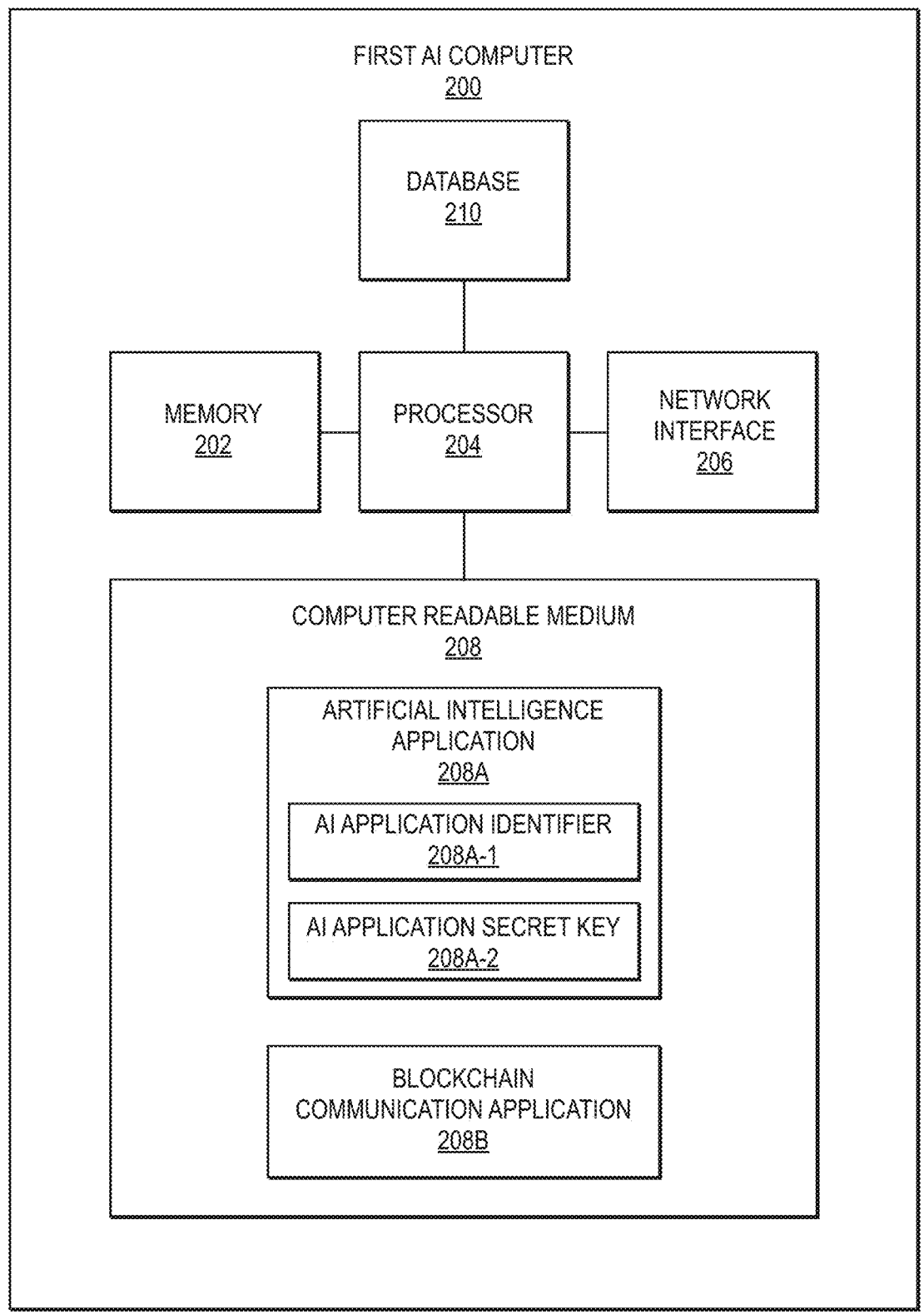
FIG. 2 shows a block diagram of components of an exemplary AI computer according to embodiments.

FIG. 2 shows a block diagram of an exemplary AI computer 200 according to embodiments. The AI computer 200 could be representative of the first AI computer 20 or the second AI computer.

The exemplary AI computer 200 may comprise a data processor 204. The data processor 204 may be coupled to a memory 202, a network interface 206, and a non-transitory computer readable medium 208. The non-transitory computer readable medium 208 can comprise any suitable number of applications.

The memory 202 can be used to store data and code. The memory 202 may be coupled to the processor 204 internally or externally (e.g., cloud based data storage), and may comprise any combination of volatile and/or non-volatile memory, such as RAM, DRAM, ROM, flash, or any other suitable memory device. For example, the memory 202 can store data, identifiers, etc.

The computer readable medium 208 may comprise an artificial intelligence application 208A. The artificial intelligence application 208A may store an artificial intelligence program such as a neural network. It may also store an AI application identifier 208A-1 and an AI application secret key 208A-2. The computer readable medium may also comprise a blockchain communication application 208B. The blockchain communication application 208B may comprise code for communicating with a blockchain.

The computer readable medium 208 may comprise code, executable by the processor 204, for performing a method comprising: collecting, by a first AI application of a first AI computer, data to include in a dataset; including, by the first AI application of the first AI computer, an offer for the dataset into an offering platform; receiving, by the first AI application of the first AI computer, a response to the offer from a second AI application of a second AI computer; determining, by the first AI application of the first AI computer, whether or not to provide the dataset to the second AI application of the second AI computer; and based on the determining, providing, by the first AI application of the first AI computer, the dataset to the second AI application of the second AI computer.

In other embodiments, the computer readable medium 208 may comprise code, executable by the processor 204, for performing a method comprising: selecting, by a second AI application of a second AI computer, an offer for a dataset on an offering platform; transmitting, by the second AI application of the second AI computer, a response to the offer to a first AI application of a first AI computer associated with the offer, wherein the first AI application of the first AI computer determines whether or not to provide the dataset to the second AI application of the second AI computer; and receiving, by the second AI application of the second AI computer, the dataset from the first AI application of the first AI computer.

The network interface 206 may include an interface that can allow the AI computer 200 to communicate with external computers. The network interface 206 may enable the AI computer 200 to communicate data to and from another device (e.g., a second device, third device, etc.). Some examples of the network interface 206 may include a modem, a physical network interface (such as an Ethernet card or other Network Interface Card (NIC)), a virtual network interface, a communications port, a Personal Computer Memory Card International Association (PCMCIA) slot and card, or the like. The wireless protocols enabled by the network interface 206 may include Wi-Fi™. Data transferred via the network interface 206 may be in the form of signals which may be electrical, electromagnetic, optical, or any other signal capable of being received by the external communications interface (collectively referred to as "electronic signals" or "electronic messages"). These electronic messages that may comprise data or instructions may be provided between the network interface 206 and other devices via a communications path or channel. As noted above, any suitable communication path or channel may be used such as, for instance, a wire or cable, fiber optics, a telephone line, a cellular link, a radio frequency (RF) link, a WAN or LAN network, the Internet, or any other suitable medium.

The database 210 may store data such as high frequency data obtained from the rapid data aggregator 10 and/or data sets created from the high frequency data. The database may be a conventional, fault tolerant, relational, scalable, secure database such as Oracle™ or Sybase™. The database 210 may be implemented using various standard data-structures, such as an array, hash, (linked) list, structured text file (e.g., XML), table, and/or the like. Such data-structures may be stored in memory and/or in (structured) files.

Figure 3:
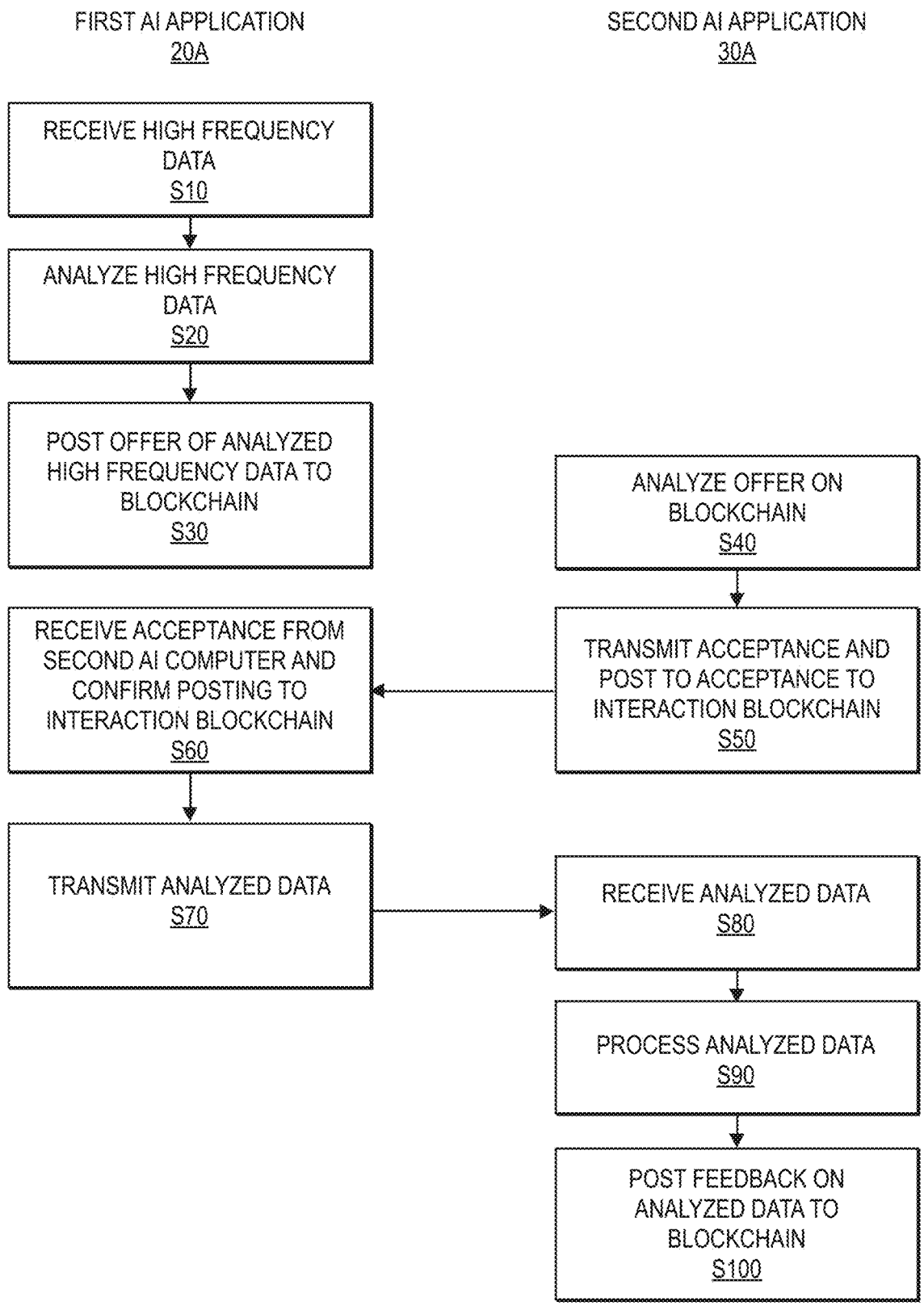
FIG. 3 shows a flowchart illustrating a method associated with an interaction between a first AI application and a second AI application.

FIG. 3 shows a flowchart illustrating a method according to an embodiment of the invention. The method in FIG. 3 can be described with reference to the entities in FIG. 1.

As illustrated in FIG. 1, the system can include a first AI computer 20 with a first AI application 20A and a second AI computer 30 with a second AI application 30A. In some embodiments, the first AI application 20A and the second AI application 30A may be associated with different entities. The first AI application 20A can be associated with a first entity A and the second AI application 20B may be associated with a second entity B. The first entity A could also operate the rapid data aggregator 10, which can collect, analyze, or process data from the user devices 90 or other data sources 96.

In one specific example, the first entity A could be an entity such as an organization that operates a social network (e.g., Twitter®), while the second entity could be an organization that predicts future economic conditions in a certain geographic area such as the United States. The data that is being rapidly aggregated by the rapid data aggregator 10 could be data from real time messages posted by various people in the social network.

In another example, the first entity A can be an entity such as an IOT data aggregator that operates a number of IOT devices that collect data. The data that is being aggregated could be sensor data from those IOT devices.

In step S10, the first AI application 20A of the first AI computer 20 can receive high frequency data from the rapid data aggregator 10 directly or via the communications network 40. After receiving the high frequency data, the first AI application 20A can determine that a portion of the data is usable (e.g., valuable, etc.) and can collect the data to form a dataset. For example, the rapid data aggregator 10 could also feed raw data from social media posts to the first AI application 20A. In another example, the rapid data aggregator 10 could feed raw sensor data from an IoT network to the first AI application 20A.

In step S20, the first AI application 20A can then optionally analyze the high frequency data received from the rapid data aggregator 10. In some embodiments, the high frequency data can be filtered or preprocessed. For example, the high frequency data could be social media posts, and certain data that might be useful to entities, such as the entity operating the second AI computer 30, might be extracted from the social media posts. For instance, the entity operating the second AI computer 30 might be interested in predicting future economic conditions in the United States.

Such data might be extracted from the high frequency data and may include data from posts from influential politicians that might have some effect on the economy, specific posts from individuals about what they are buying and the status of their employment, etc. Such data could be collected into a dataset and stored by the first AI computer 20.

In another example, the first AI application 20A could preprocess data from different IoT devices such that only data from certain types of IoT devices are collected (e.g., just road sensors). For instance, the entity operating the second IA computer 30 might be interested in high frequency data from only road sensors (and not weather sensors) to train the second AI application to determine when how to control lights, traffic control signals, etc. on roadways within a certain geographic area.

In step S30, after the high frequency data has been analyzed, the first AI application 20A can then provide an offer to the offering blockchain 60 that the received data is available. For example, the first AI application 20A can post an offer to the offering blockchain 60 for the dataset. The offer may include a first AP application identifier, a description of the dataset, and a dataset identifier. A timestamp and an expiration time/date may also be associated with the offer and posted to the offering blockchain 60. In some embodiments, the offer may be signed by a private key of the first AI application 20A and the digital signature may be stored with the offer.

In step S40, after the first AI application 20A has posted the offer to the offering blockchain 60, the second AI application 30A can scan the offering blockchain 60 for any relevant data that might be offered by various entities. The second AI application 30A can select the offer for the dataset on the offering blockchain 60 and decide to interact with the first AI application 20A to acquire the data associated with the post on the offering blockchain 60. To do so, the second AI application 30A may look up the particular interface that is used by the first AI application 20A on the interface blockchain 70. The second AI application 30A may also consult with the reputation blockchain 66 to determine if the first AI application 20A and/or any data coming from the first AI application 20A is considered to be reliable by the participants in the system 100. The second AI application 30A may also look up any price that may be associated with the requested data from the first AI application 20A on the offering blockchain 60. The second AI application 30A may also obtain a copy of the public key associated with the first AI application 20A and may verify the digital signature associated with the offer.

In step S50, the second AI application 30A can transmit a response to the offer in the form of an acceptance to the first AI application 20A. In some embodiments, a handshake may be performed between the first and second AI applications 20A, 30A. Further, the first and second AI applications 20A, 30A can exchange reputation data as recorded on the reputation blockchain 66.

At step S60, the first AI application 20A can receive an acceptance from the second AI application 30A. The first AI application 20A can then determine whether or not to provide the dataset to the second AI application 30A. For example, the first AI application 20A can agree to suitable terms with the second AI application 30A before providing the dataset to the second AI application 30A.

The first AI application 20A and/or the second AI application 30A can then post the interaction to the interaction blockchain 50. Both the first AI application 20A and the second AI application 30A may sign the interaction data with their respective private keys and the signatures may be posted to the interaction blockchain 50.

In some embodiments, after communicating and agreeing to terms, the second AI application 30A can send a blockchain payment to, for example, an address of the first AI application 20A on the interaction blockchain 50. The second AI application 30A can then transfer, for example, currency of the blockchain in the interaction blockchain 50 to the first AI application 20A in any suitable manner. In other embodiments, the interaction blockchain 50 may itself be considered a cryptocurrency blockchain and the values of any unspent transactions can be present in the blockchain for the various AI applications in the system.

At step S70, the first AI application 20A can transmit the dataset to the second AI application 30A and the second AI application 30A can receive the dataset. In some embodiments, first AI application 20A can provide the dataset directly to the second AI application 30A. In other embodiments, the first AI application 20A can provide access to an API to the second AI application 30A. The API can be capable of allowing the AI platform A to retrieve the dataset from a database or other suitable location of storage.

At step S80, the second AI application 30A can then receive the dataset.

At step S90, after receiving the dataset, the second AI application 30A can process the dataset by running and/or training a machine learning model using the dataset. For example, the second AI application 30A can train a neural network or SVM using the dataset. For example, the dataset can include social media posts from politicians (which may be created at a high frequency). The second AI application 30A can train a machine learning model to determine, for example, whether or not a particular social media post will have an influence on a policy, the economy, a stock, a law, etc. In another example, the second IA application 30A can train a neural network or SVM using data from an IoT network. The trained neural network or SVM can be used to control the operation of other machines (e.g., lights, cameras, etc.). In some embodiments, the second AI application 30A can perform sentiment analysis on the dataset.

At step S100, the second AI application 30A can then post feedback on the received and analyzed dataset from the first AI application 20A to the reputation blockchain 66. The feedback could be in any form and could be in the form of a score (e.g., from 1 to 10, where the higher number indicates higher quality data), or residuals (e.g., any outputs created by the second AI application 30A when processing the data in the received dataset). The feedback posted on the reputation blockchain 66 can be associated with an identifier for the first AI application 20A and an identifier for the second AI application 30A. The second AI application 30A may also digitally sign any feedback data posted to the reputation blockchain 66. In some embodiments, at a suitable point in time thereafter, the first AI application 20A can validate and/or verify the feedback posted to the reputation blockchain 66 by the second AI application 30A.

Any suitable metric of the performance of the model can be used to update the reputation blockchain 66. For example, the second AI application 30A can add residuals output by the model to the blockchain. As an illustrative example, if the dataset is a good dataset (e.g., an objectively good dataset) the residuals or other machine learning model performance metrics can portray the quality of the data. Thus, a good dataset can yield good performance and then be associated with residuals on the reputation blockchain which can represent the good performance. Otherwise, if a dataset results in poor performance, then the residuals can reflect the poor performance.

In some embodiments, a dispute may arise between the first and second AI applications 20A, 30A. If the first AI application 20A and the second AI application 30A disagree (e.g., disagree on an event which occurred or did not occur) about the feedback posted by the second AI application 30A to the reputation blockchain 66, then data associated with the disagreement can be posted on the reputation blockchain 66 by either or both of the first AI application 20A or the second AI application 30A.

In some embodiments, a dispute resolution entity such as the reviewer computer 80 can evaluate and resolve any disagreements which arise.

Figure 4:
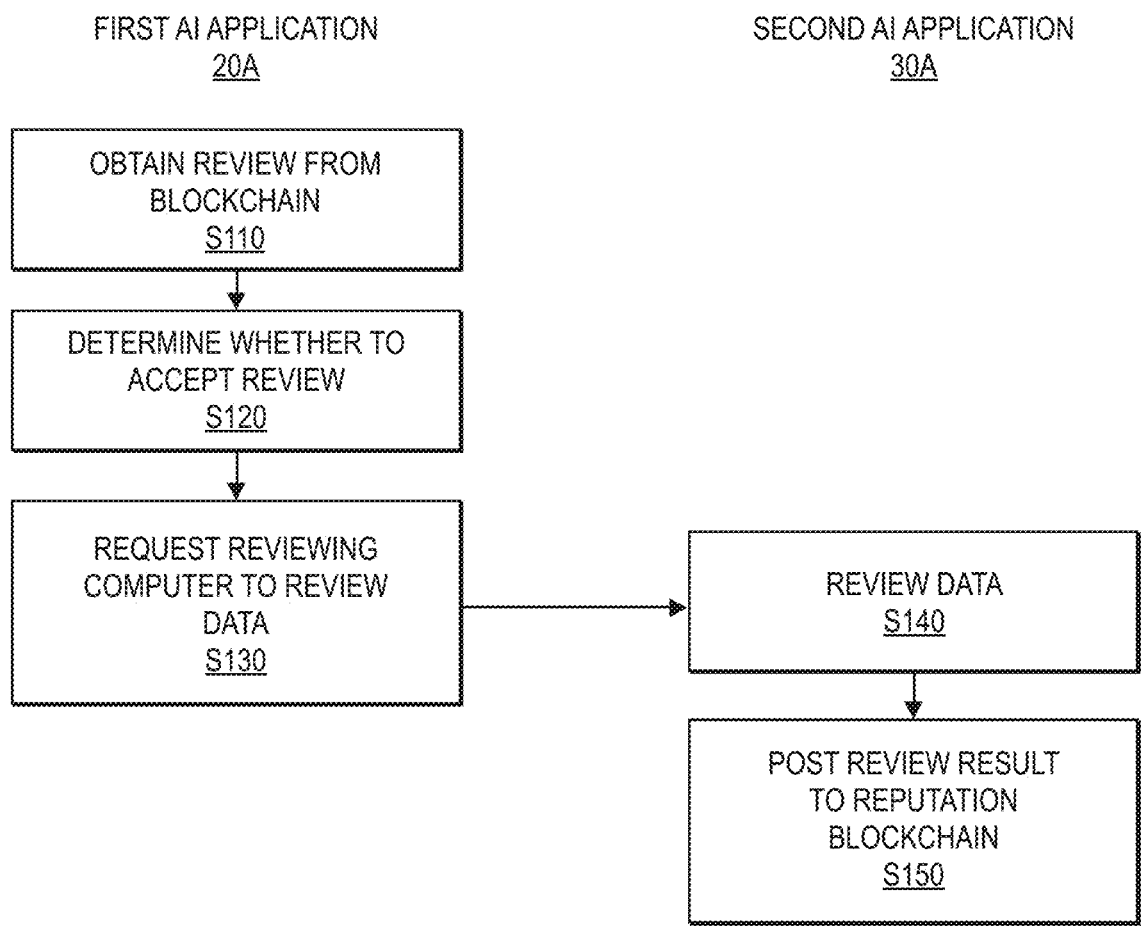
FIG. 4 shows a flowchart illustrating a method for a review process according to embodiments.

Referring to FIG. 4, in step S110 the first AI application 32A can obtain the feedback about the second AI application's 30A review of the data that the first AI application 20A provided to the second AI application 30A from the reputation blockchain 66.

In step S120, the first AI application 20A can determine whether or not to accept the review of the second AI application 30A of the data provided by the first AI application 20A. For example, the results may be inconsistent with the data, exceed a threshold of results, etc. After rejecting the results, the first AI application 20A can calculate a rebuttal to the results. For example, the first AI application 20A can determine a correlation within the residuals (e.g., results), issues with the model, and/or any other rebuttal which indicates a problem with the results. In some embodiments, first AI application 20A can include the rebuttal in the reputation blockchain 66. The second AI application 30A may be notified by the first AI application 20A of the first AI application's decision regarding whether or not to accept the review of the second AI application 30A.

In step S130, if the first AI application 20A does not agree with the review of the second AI application 30A of the dataset provided by the first AI application 20A, then the first AI application 20A can transmit a request to review the dataset by the reviewer computer 80. The request may include the dataset that as previously provided by the first AI application 20A to the second AI application 30A. In some embodiments, the dataset can be provided to the reviewer computer 80 using secure multi-party computation to protect the dataset.

In step S140, the reviewer computer 80 may review the dataset by performing its own analysis of the dataset.

In step S150, after reviewing the dataset, the reviewer computer 80 may post a review of the dataset to the reputation blockchain 60.

Note that in some embodiments, since the reputation feedback can affect both the first AI application 20A and the second AI application 30A, both of the first and second AI applications 20A, 30A may need to make sure that the feedback is accurate (e.g., if the second AI application 30A has processing issues (e.g., the second AI application 30A does not generally process dataset to produce good results), then other AI applications may not give the second AI application 30A access to their datasets).

Figure 5:
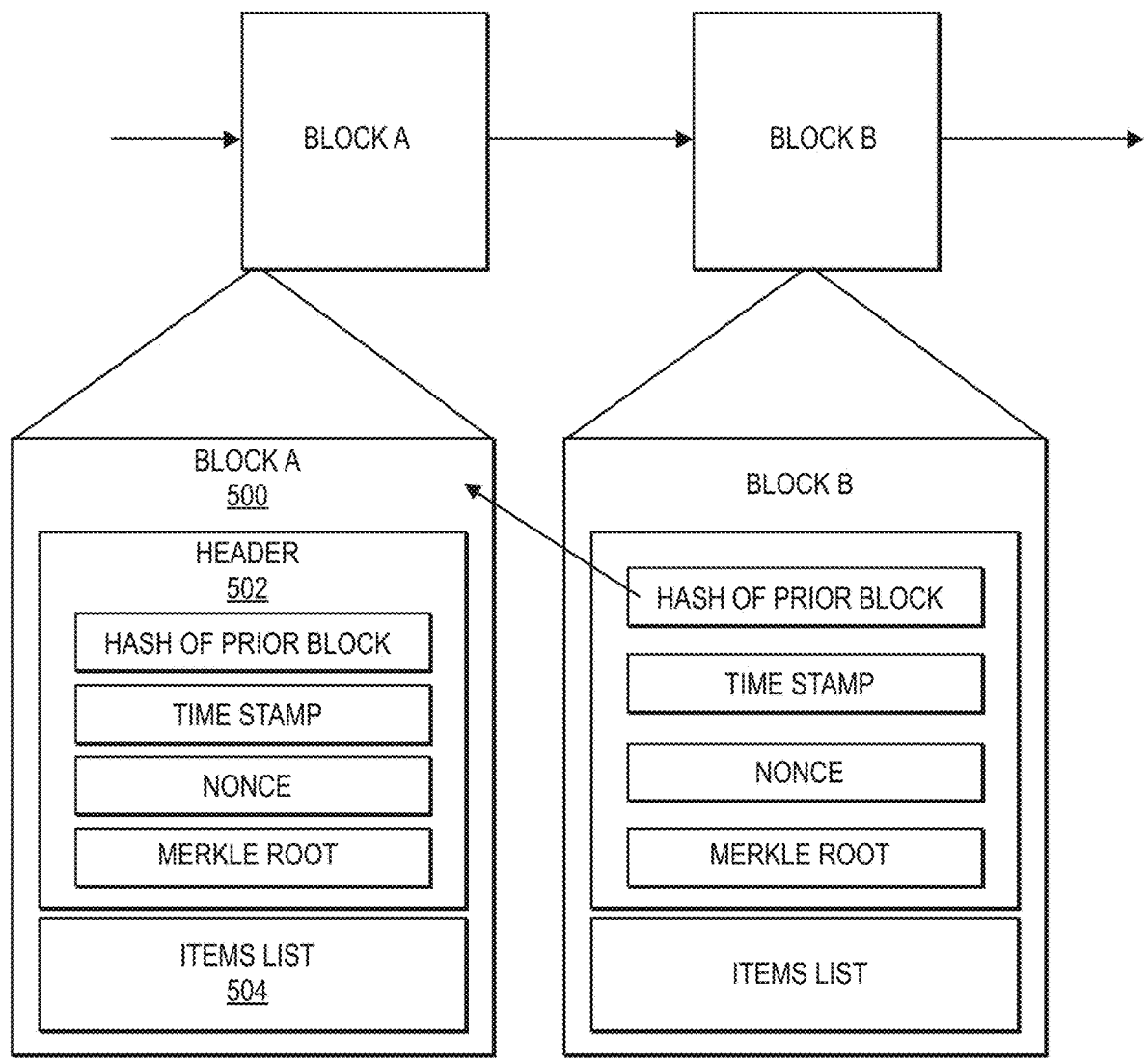
FIG. 5 shows an exemplary diagram of a portion of a blockchain.

FIG. 5 shows a blockchain comprising block entries for at least a block A and a block B. The blockchain may also include additional block entries before a block A and/or after a block B, which are not depicted in FIG. 5.

Each block entry 500 may comprise a header 502 comprising a hash of a prior block, a timestamp, a nonce, and a Merkle Root. As in the known blockchain protocol associated with Bitcoin, the nonce and the Merkle Root may be used in a validation process for a particular transaction.

The block 500 may also include an blockchain body which may comprise an items list 504. The items list 504 may be different for the various previously described blockchains including the interaction blockchain 50, the offering blockchain 60, the reputation blockchain 66, and the interface blockchain 70.

An item in the interaction blockchain 50 may include an identifier for the first AI application, an identifier for the second AI application, a description of the dataset to be acquired by the second AI application from the first AI application, and a price associated with the transfer of the dataset, and digital signatures of the first AI application and/or the second AI application to indicate their assent to the interaction. In some embodiments, the description of the dataset may include a dataset identifier. The interaction blockchain 50 may also serve as cryptocurrency within the system, where each interaction can constitute an amount spent, and unspent transaction outputs from past transactions on the interaction blockchain 50 can constitute a total amount of currency that may be held by a particular AI application.

An item in the offering blockchain 60 can include a descriptions of an offer, each offer including an AI application identifier of the application offering the dataset, a description of the dataset, an identifier of the dataset, and optionally a time period in which the offer for the dataset is valid.

An item in the reputation blockchain 66 can include reputations and/or feedback provided by an AI application or a reviewer computer 80 in the system.

An item in the interface blockchain 70 can include data regarding an interface or interaction associated with a particular AI application or its associated dataset.

Embodiments of the invention have a number of advantages. For example, embodiments allow AI agents to efficiently retrieve high frequency data and communicate the high frequency data to a second AI agent. The transfer and analysis of high frequency data can occur without delay, and the system is trusted since any interactions between the AI applications can be stored in immutable blockchains. Further, the reputation services provided by embodiments ensures that the passage of higher quality datasets to higher quality AI applications occurs.

Although the steps in the flowcharts and process flows described above are illustrated or described in a specific order, it is understood that embodiments of the invention may include methods that have the steps in different orders. In addition, steps may be omitted or added and may still be within embodiments of the invention.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

As used herein, the use of "a," "an," or "the" is intended to mean "at least one," unless specifically indicated to the contrary.

What is claimed is:

1. A method comprising:
    collecting, by a first artificial intelligence (AI) application of a first AI computer, high frequency data from an online platform that is to be included in a dataset;
    providing, by the first AI application of the first AI computer, an offer for the dataset to an offering blockchain;
    determining, by a second AI application of a second AI computer, whether it desires to interact with the first AI application of the first AI computer, the determining being performed by accessing a reputation blockchain to obtain a first score associated with the first AI application, the first score being indicative of a quality of data previously provided by the first AI application;
    responsive to a successful determination by the second AI application, receiving, by the first AI application of the first AI computer, a response to the offer from the second AI application of a second AI computer;
    determining, by the first AI application of the first AI computer, whether or not to provide the dataset to the second AI application of the second AI computer, wherein the first AI application performs the determining by accessing the reputation blockchain to obtain a second score associated with the second AI application, the second score being indicative of a quality of processing results generated by the second AI application with respect to processing previous datasets, the quality of processing results being determined based on a usage of the processing results by other AI computers;
    responsive to a successful determination by the first AI application, providing, by the first AI application of the first AI computer, the dataset to the second AI application of the second AI computer in an interaction, wherein the second AI application accesses an interaction blockchain to obtain networking information to communicate with the first AI application, and wherein the offering blockchain, the reputation blockchain, and the interaction blockchain are independent of one another;
    training, by the second AI computer, a machine learning model based on the dataset to generate a trained machine learning model; and
    utilizing the trained machine learning model to generate one or more control signals to operate one or more machines.

2. The method of claim 1, wherein the first AI application is associated with a first AI identifier, and wherein the first AI identifier is included in the offer.

3. The method of claim 1, wherein the high frequency data is derived from a plurality of user devices.

4. The method of claim 1, further comprising:
    reviewing by the first AI application, a review of the dataset on the reputation blockchain provided by second AI application.

5. The method of claim 1, wherein the reputation blockchain comprises a header and a body, the body comprising a plurality of reviews.

6. The method of claim 1, wherein the dataset is derived from social network data.

7. The method of claim 1, wherein the second AI computer posts a value for the first AI computer for receiving the dataset.

8. The method of claim 1, wherein the first AI computer communicates with the second AI computer over a communications network, the communications network comprising an Internet.

9. An artificial intelligence (AI) computer comprising:
    a processor; and
    a computer readable medium coupled to the processor, the computer readable medium comprising code, executable by the processor, to implement a method comprising
        collecting high frequency data from an online platform that is to be included in a dataset;
        providing an offer for the dataset to an offering blockchain;
        receiving a response to the offer from a second AI application of a second AI computer, wherein the second AI application determines whether it desires to interact with the AI computer by accessing a reputation blockchain to obtain a first score associated with a first AI application, the first score being indicative of a quality of data previously provided by the first AI application;
        determining whether or not to provide the dataset to the second AI application of the second AI computer by accessing the reputation blockchain to obtain a second score associated with the second AI application, the second score being indicative of a quality of processing results generated by the second AI application with respect to processing previous datasets, the quality of processing results being determined based on a usage of the processing results by other AI computers; and
        responsive to a successful determination by the first AI application, providing the dataset to the second AI application of the second AI computer in an interaction, wherein the second AI application accesses an interaction blockchain to obtain networking information to communicate with the first AI application, and wherein the offering blockchain, the reputation blockchain, and the interaction blockchain are independent of one another, wherein the second AI computer is further configured to: (i) train a machine learning model based on the dataset to generate a trained machine learning model; and (ii) utilize the trained machine learning model to generate one or more control signals to operate one or more machines.

10. The AI computer of claim 9, wherein the computer readable medium comprises an AI application.

11. The AI computer of claim 9, wherein the computer readable medium comprises a blockchain communication application.

12. The AI computer of claim 9, wherein the high frequency data is acquired from an Internet of Things network.

13. The AI computer of claim 9, wherein the computer readable medium comprises an AI application comprising a neural network.

14. The AI computer of claim 9, wherein the AI computer comprises a plurality of networked computational devices.

15. A method comprising:

selecting, by a second artificial intelligence (AI) application of a second AI computer, an offer for a dataset on an offering blockchain, the dataset being offered by a first AI application of a first AI computer, wherein the second AI application determines to make the offer for the dataset by accessing a reputation blockchain to obtain a first score associated with the first AI application, the first score being indicative of a quality of data previously provided by the first AI application;

transmitting, by the second AI application of the second AI computer, a response to the offer to the first AI application of the first AI computer associated with the offer, wherein the first AI application of the first AI computer determines whether or not to provide the dataset to the second AI application of the second AI computer by accessing the reputation blockchain to obtain a second score associated with the second AI application, the second score being indicative of a quality of processing results generated by the second AI application with respect to processing previous datasets, the quality of processing results being determined based on a usage of the processing results by other AI computers;

receiving, by the second AI application of the second AI computer, the dataset from the first AI application of the first AI computer, wherein the second AI application accesses an interaction blockchain to obtain networking information to communicate with the first AI application, and wherein the offering blockchain, the reputation blockchain, and the interaction blockchain are independent of one another;

training, by the second AI computer, a machine learning model based on the dataset to generate a trained machine learning model; and, utilizing the trained machine learning model to generate one or more control signals to operate one or more machines.

16. The method of claim 15, further comprising:
analyzing the dataset from the first AI computer.

17. The method of claim 16, further comprising:
posting a review of the analyzed dataset to the reputation blockchain.

18. The method of claim 15, further comprising:
posting a value to a blockchain in association with the response to the offer.

* * * * *